United States Patent
Jordan

(10) Patent No.: US 10,048,016 B2
(45) Date of Patent: Aug. 14, 2018

(54) DUAL-CHAMBER HEAT EXCHANGER

(75) Inventor: Michael Wayne Jordan, Weatherford, TX (US)

(73) Assignee: Michael Wayne Jordan, Weatherford, TX (US)

( * ) Notice: Subject to any disclaimer, the term of this patent is extended or adjusted under 35 U.S.C. 154(b) by 329 days.

(21) Appl. No.: 13/297,188

(22) Filed: Nov. 15, 2011

(65) Prior Publication Data

US 2013/0118719 A1 May 16, 2013

(51) Int. Cl.
*F28D 21/00* (2006.01)
*F24H 1/28* (2006.01)
*F24H 8/00* (2006.01)
*F28D 7/02* (2006.01)

(52) U.S. Cl.
CPC .......... *F28D 21/0003* (2013.01); *F24H 1/28* (2013.01); *F24H 8/00* (2013.01); *F28D 7/024* (2013.01); *Y02B 30/102* (2013.01)

(58) Field of Classification Search
CPC .......... F24H 1/28; F24H 8/00; F28D 21/0003; F28D 7/024; Y02B 30/02
USPC .......... 122/7 R, 235.12, 425, 468, 40, 406.4, 122/155.5, 18.3, 18.31; 165/263, 168, 165/180, 121; 60/318; 431/1
See application file for complete search history.

(56) References Cited

U.S. PATENT DOCUMENTS

| | | | | |
|---|---|---|---|---|
| 1,611,364 A | * | 12/1926 | Parker | F24H 1/40 122/155.4 |
| 1,754,472 A | * | 4/1930 | Kuenhold | F24H 1/205 122/156 |
| 1,873,838 A | * | 8/1932 | Gebhard | 165/263 |
| 2,727,495 A | * | 12/1955 | Matsumoto et al. | 122/185 |
| 2,965,079 A | * | 12/1960 | Collinson | 122/24 |
| 3,243,575 A | * | 3/1966 | Vignere, Sr. | 392/399 |
| 4,259,928 A | * | 4/1981 | Huber | 122/24 |
| 4,280,450 A | * | 7/1981 | Maruyama | F24H 1/287 122/13.01 |
| 4,569,310 A | * | 2/1986 | Davis | 122/24 |
| 5,950,573 A | * | 9/1999 | Shellenberger | F23D 14/82 122/18.31 |
| 6,070,559 A | * | 6/2000 | Schlesch | F22B 7/00 122/140.1 |
| 8,246,915 B2 | * | 8/2012 | Boer et al. | 422/198 |

* cited by examiner

*Primary Examiner* — Steven B McAllister
*Assistant Examiner* — Benjamin W Johnson

(57) ABSTRACT

The invention is a heat exchanger that transfers heat from one medium to another by pulling a heated medium through a series of expansion chambers and water-immersed tubes that transfers the heat from one medium to another, including a secondary set of coils to increase the efficiency.

3 Claims, 2 Drawing Sheets

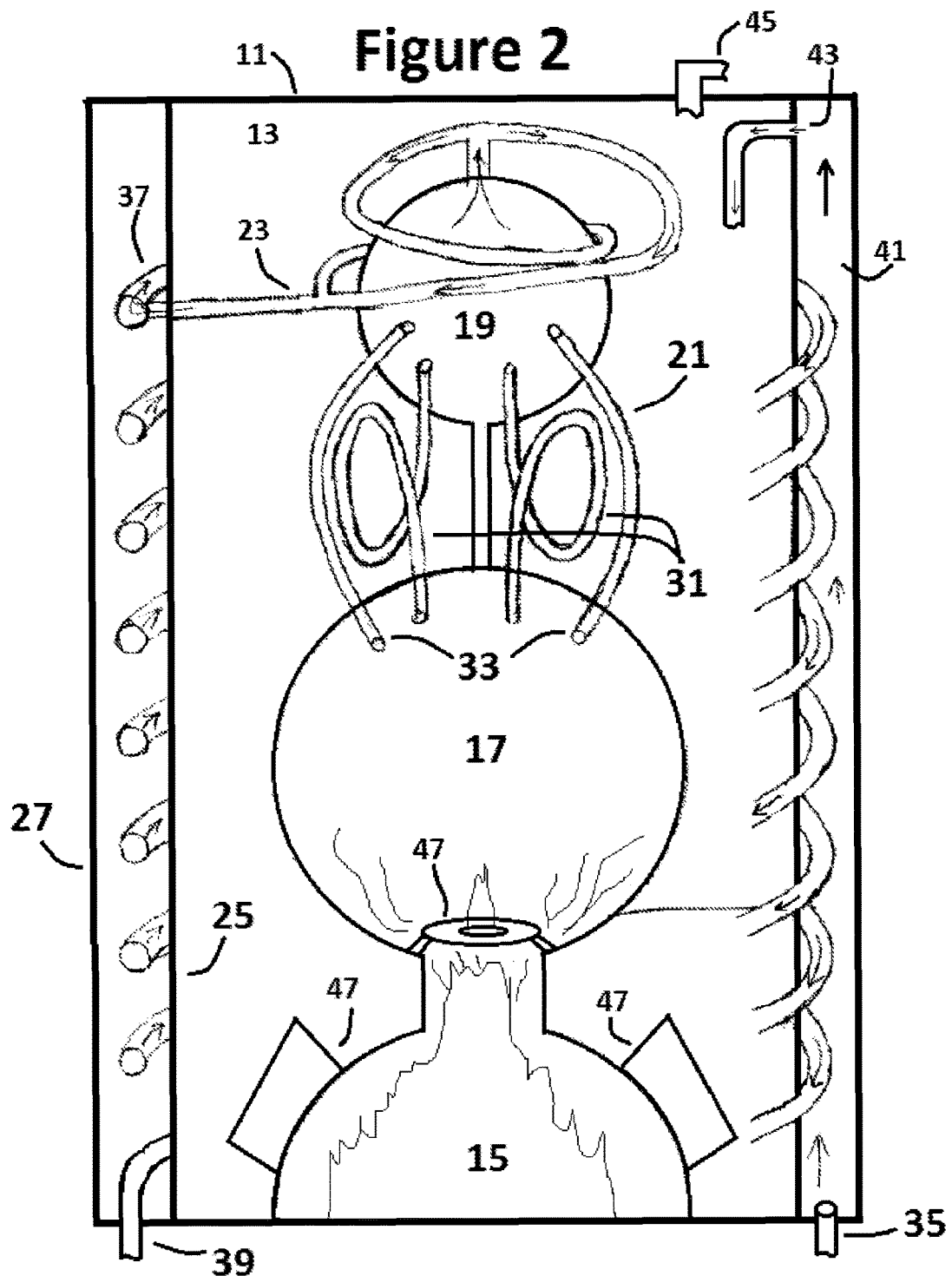

DUAL-CHAMBER HEAT EXCHANGER

CROSS-REFERENCES TO RELATED APPLICATIONS

Figure 1:
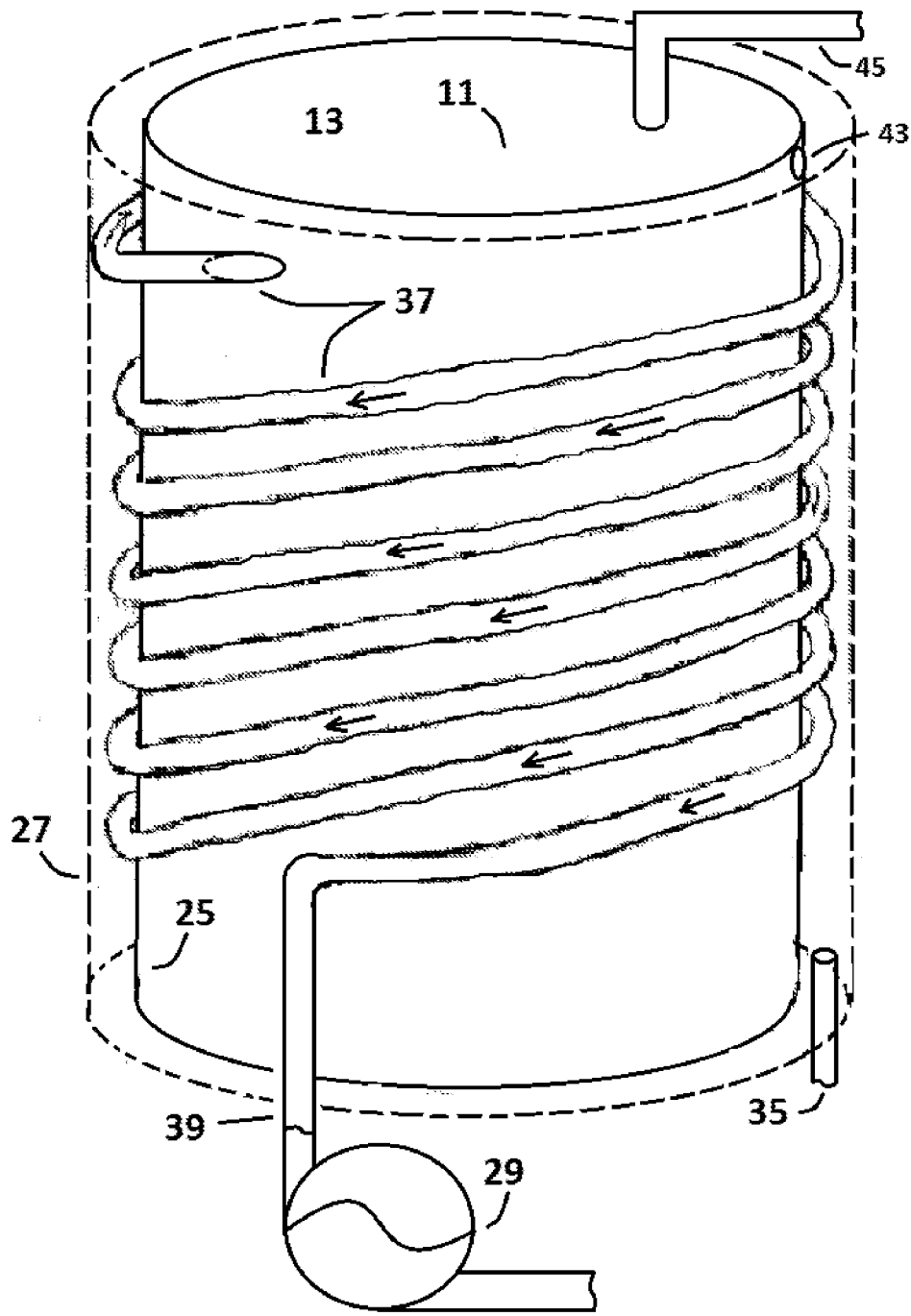

None.

STATEMENT REGARDING FEDERALLY SPONSORED RESEARCH AND DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

Field of the Invention

The invention pertains to fuel-fired heat exchanger using a combustion chamber and heat transfer radiators.

Background Art

Traditional direct-vent heat exchangers comprise a water tank, a combustion chamber where a gas fuel burns to heat air, and a flue system in which air circulates in a radiator surrounding by water, the radiator transferring the heat carried by the air to the water. These systems often have a sealed combustion chamber and blowers to assist air flow through the system.

Heat exchangers are known in the industry; in particular, water heater construction techniques are well established, with many types of heater combustion chambers. The prior art is rich in very old construction and patented approaches to the many difficulties of designing effective heat exchangers, many of which include: the transfer of heat which comes from a combustion chamber to the water, condensation problems, heat transfer efficiency, and the challenge of a system that can be kept clean over the life of the system.

An overview of the prior art includes patented water tanks, e.g., U.S. Pat. No. 7,500,454, heat chambers, e.g., U.S. Pat. No. 7,946,257, unique duct and flue systems e.g., U.S. Pat. No. 7,992,526 and U.S. Pat. No. 7,997,236, fin-equipped metal fins to increase efficiency, e.g., U.S. Pat. No. 7,836,856, and pipe assemblies to conduct the heat from the air to water, e.g., U.S. Pat. No. 7,434,545, U.S. Pat. No. 7,458,340, and U.S. Pat. No. 7,523,721.

As these and other patents show, inventors and the heat exchanger industry continues to struggle in building a more efficient water heater, continuously looking for higher efficiency, longer productive life, less expensive manufacturing costs, and less frequent cleaning requirements.

BRIEF SUMMARY OF THE INVENTION

The invention is a heat exchanger that transfers heat from one medium to another, typically heated air to water by pulling the heated air through a series of chambers and water-immersed tubes that transfers the heat from the air to the water, including a secondary set of coils that encircle the outermost portion of the water chamber to increase the efficiency. The size of the tube acts as a metering device that slows the velocity of the medium, which also reduces the pressure in the radiator/flue portion of the exchanger. The slower velocity of the transfer medium, coupled with the lower pressure allows for the medium to be cooled or heated more effectively.

BRIEF DESCRIPTION OF THE SEVERAL VIEWS OF THE DRAWING(S)

FIG. 1—A side plan view of an embodiment of the invention showing the inside wall 25 and secondary transfer coil 37, and outer wall 27 shown with invisible lines.

FIG. 2—A sectional view of an embodiment of the invention illustrated in FIG. 1.

DETAILED DESCRIPTION OF THE INVENTION

Water is efficiently heated by use of the present invention, a dual-walled heat exchanger 11 including: a main water tank 13 surrounded by an inner wall 25, a preheat tank 41 defined as the volume between the inner wall 25 and outer wall 27 of the water heater, a heat transfer apparatus sitting inside the main water tank 13, a gas-fired combustion chamber 15, a primary gas expansion chamber 17, a secondary expansion sphere 19, a system of thermal transfer pipes 21 connecting the primary gas expansion sphere 17 and secondary gas expansion sphere 19, and an exhaust flue 23 which contains exhaust gases from the secondary expansion sphere 19 to a secondary transfer coil 37 mounted in the preheat tank 41 which preheats water before it enters the main volume of the tank 13 through main tank entrance portal 43. An optional pump 29 pulls heated air through the system. Heated water leaves the exchanger 11 through water exit portal 45.

Water flow—Water flows under pressure into the heat exchanger 11 initially through portal 35 into the preheat tank 41. The water flows through the preheat tank 41, slowly warmed by the secondary transfer coil 37, and from the preheat tank through the main tank entrance portal 43 into the main tank 13. Once inside the main tank 13, the water is heated by the chambers 15, 17, 19, and thermal transfer pipes 21 before leaving the main tank 13 through the exit portal 45.

Air flow—As shown in FIG. 2, the typical construction assumes a gas-fired combustion changer 15 in which a gas burner creates heated air which rises or is pulled by a pump into the primary gas expansion chamber 17. Existing heat exchangers use both sealed and unsealed combustion chambers. Sealed combustion chambers are preferred, but not necessary. The gas expands in the primary chamber 17 and releases heat through the walls of the chamber 17 and into water in the tank 13. As the hot air moves through the system, it then proceeds swiftly through the smaller thermal transfer pipes 21 into the secondary gas expansion chamber 19.

Gas moves slowly through the secondary gas expansion chamber 19 and into the exhaust flue 23. Once in the flue 23, the heat transfer continues as the air swiftly travels through a secondary heat transfer coil 37 mounted between the inner wall 25 and the outer wall 27 before leaving the exchanger 11. The embodiment can transfer so much heat from the heated air to the water in the tank 13 that it creates condensation in the exhaust flue. The resulted condensation created in this way will simply come down through the secondary heat transfer coil 37, providing desalinated water that can be collected from the gas exit portal 39 as it leaves the water heater.

Optional components—An optional pump is located outside and separate from this exchanger, and is not a necessary part of the invention, but only a serves to increase speed of exhaust gases and thereby increase the operational speed as a pre-heater to the incoming water which enters through a water entrance port 35 near the base of the water heater 11. Other optional components include a baffle in the primary expansion chamber 17 and radiation fins 47 on any of the spherical chambers in the water heater 15, 17, 19, symbolically shown in FIG. 2 on the combustion chamber 15, but not limited solely to that particular chamber.

Heat transfer pipes 21 shown in FIG. 2 can be a variable shape and length; the embodiment shown includes a thermal transfer pipe configuration of eight pipes, four of them looped 31, and four more as simple connection pipes 33. (Four of the eight pipes are not shown in FIG. 2 because it is a sectional view.)

The current invention uses spherical combustion and expansion chambers because they have been found to be most efficient, but need not be in order for the invention to function. The exchanger employs gas expansion in the spherical chambers 15, 17, 19 and the thermal transfer tubes 21 to heat the water inside the tank 13. This approach and particular construction of the device as described provides high transfer of energy from the combusted gas fuel to the water flowing through the exchanger 11.

While this invention has been described as it is currently built, the invention is not limited to the disclosed embodiments, but can be employed in various equivalent arrangements included within the spirit and scope of the claims.

The invention claimed is:

1. A dual-walled heat exchanger 11 comprising:
   a main water tank (13), the main water tank surrounded by an inner wall (25) and positioned within a water heater;
   a preheat tank (41) defined as the volume between the inner wall (25) and outer wall (27) of the water heater;
   a gas-fired combustion chamber (15);
   a primary gas expansion chamber (17) above the gas-fired combustion chamber;
   a secondary gas expansion sphere (19) above the primary gas expansion chamber;
   a system of thermal transfer pipes (21) connecting the primary gas expansion chamber (17) and secondary gas expansion sphere (19);
   an exhaust flue (23) connected with the secondary gas expansion sphere; and
   a secondary transfer coil (37) mounted in the preheat tank (41);
   wherein exhaust gases exit from the secondary gas expansion sphere (19) and then pass through the secondary transfer coil (37) mounted in the preheat tank (41), thereby preheating water before it enters the main water tank (13) through a main tank entrance portal (43).

2. The dual-walled heat exchanger as in claim 1, further comprising a vacuum pump that pulls exhaust gases through the dual-walled heat exchanger.

3. The dual-walled heat exchanger as in claim 1, wherein the combustion chamber (15), primary gas expansion chamber (17) and secondary gas expansion sphere (19) are spherical.

\* \* \* \* \*